US012404825B2

(12) United States Patent
Ishikawa

(10) Patent No.: US 12,404,825 B2
(45) Date of Patent: Sep. 2, 2025

(54) BLOW-BY GAS RECIRCULATION DEVICE

(71) Applicant: TOYOTA JIDOSHA KABUSHIKI KAISHA, Toyota (JP)

(72) Inventor: Masami Ishikawa, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/819,227

(22) Filed: Aug. 29, 2024

(65) Prior Publication Data

US 2025/0084808 A1 Mar. 13, 2025

(30) Foreign Application Priority Data

Sep. 7, 2023 (JP) ................................ 2023-145280

(51) Int. Cl.

*F01M 13/00* (2006.01)
*F01M 13/04* (2006.01)
*F02M 25/06* (2016.01)

(52) U.S. Cl.

CPC ............ *F02M 25/06* (2013.01); *F01M 13/04* (2013.01)

(58) Field of Classification Search

CPC ................... F02M 25/06; F01M 13/00; F01M 2013/0038; F01M 2013/0044; F01M 13/028; F01M 13/02; F01M 13/0011

See application file for complete search history.

(56) References Cited

U.S. PATENT DOCUMENTS

2008/0083399 A1* 4/2008 Hirano .................. F01M 13/02 123/572
2014/0158096 A1* 6/2014 Leone ................ F02B 29/0468 123/563

FOREIGN PATENT DOCUMENTS

| | | | | | |
|---|---|---|---|---|---|
| CN | 110778375 | A | * | 2/2020 | C08J 7/126 |
| DE | 202013008611 | U1 | * | 11/2014 | F01M 13/0011 |
| DE | 202015100375 | U1 | * | 4/2015 | F01M 13/022 |
| DE | 102014013714 | A1 | * | 3/2016 | F01M 13/02 |
| DE | 102016217686 | A1 | * | 3/2018 | |
| DE | 102017002218 | A1 | * | 9/2018 | |
| DE | 102018212103 | A1 | * | 1/2019 | F01M 11/10 |
| DE | 102019200978 | A1 | * | 7/2020 | F01M 1/18 |
| JP | S57-013814 | U | | 1/1982 | |
| JP | 2006-046244 | A | | 2/2006 | |
| JP | 2008-111422 | A | | 5/2008 | |
| JP | 2009299645 | A | * | 12/2009 | F01M 13/022 |

(Continued)

*Primary Examiner* — Lindsay M Low
*Assistant Examiner* — Teuta B Holbrook
(74) *Attorney, Agent, or Firm* — Finnegan, Henderson, Farabow, Garrett, and Dunner, LLP

(57) ABSTRACT

The blow-by gas recirculation device includes first to third passages and first and second check valves. The first to third passages respectively connect a portion of an intake passage downstream of a throttle valve, connect a portion of the intake passage downstream of an intercooler, and connect a portion of the intake passage upstream of a compressor to an interior of the crankcase. In the first passage, a first check valve is configured to permit a flow of gas from the interior of the crankcase to the intake passage and restrict a flow of gas from the intake passage to the interior of the crankcase. In the second passage, the second check valve is configured to permit a flow of gas from the intake passage to the interior of the crankcase and restrict a flow of gas from the interior of the crankcase to the intake passage.

8 Claims, 4 Drawing Sheets

(56) References Cited

FOREIGN PATENT DOCUMENTS

| | | | | |
|---|---|---|---|---|
| JP | 2017052400 | A | * | 3/2017 |
| JP | 2021055575 | A | * | 4/2021 |
| WO | WO-2021176501 | A1 | * | 9/2021 |

* cited by examiner

BLOW-BY GAS RECIRCULATION DEVICE

CROSS-REFERENCE TO RELATED APPLICATIONS

This application is based upon and claims the benefit of priority from prior Japanese Patent Application No. 2023-145280, filed on Sep. 7, 2023, the entire contents of which are incorporated herein by reference.

BACKGROUND

1. Field

The present disclosure relates to a blow-by gas recirculation device.

2. Description of Related Art

Japanese Laid-Open Patent Publication No. 2006-46244 describes a known blow-by gas treatment device for a forced-induction engine. The blow-by gas treatment device includes an air introduction passage that connects the portion of an intake passage downstream of a compressor and upstream of an intercooler to the interior of a crankcase. Further, the blow-by gas treatment device includes a recirculation passage that connects the portion of the intake passage upstream of the compressor to the interior of the crankcase. The blow-by gas treatment device ventilates blow-by gas during forced-induction operation of the forced-induction engine by delivering the fresh air pressurized by the compressor into the crankcase through the air introduction passage.

The blow-by gas recirculation device disclosed in the above publication still has room for improvement in enhancing ventilation efficiency. For example, the disclosed blow-by gas recirculation device is unable to perform ventilation during naturally aspirated operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A blow-by gas recirculation device according to an aspect of the present disclosure is configured to recirculate blow-by gas from an interior of a crankcase of a forced-induction engine to an intake passage. The forced-induction engine includes a compressor disposed in the intake passage, an intercooler disposed in a portion of the intake passage downstream of the compressor, and a throttle valve disposed in a portion of the intake passage downstream of the intercooler. The blow-by gas recirculation device includes a first passage that connects a portion of the intake passage downstream of the throttle valve to the interior of the crankcase, a second passage that connects the portion of the intake passage downstream of the intercooler to the interior of the crankcase, a third passage that connects a portion of the intake passage upstream of the compressor to the interior of the crankcase, a first check valve configured to permit a flow of gas from the interior of the crankcase to the intake passage through the first passage and restrict a flow of gas from the intake passage to the interior of the crankcase through the first passage, and a second check valve configured to permit a flow of gas from the intake passage to the interior of the crankcase through the second passage and restrict a flow of gas from the interior of the crankcase to the intake passage through the second passage.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
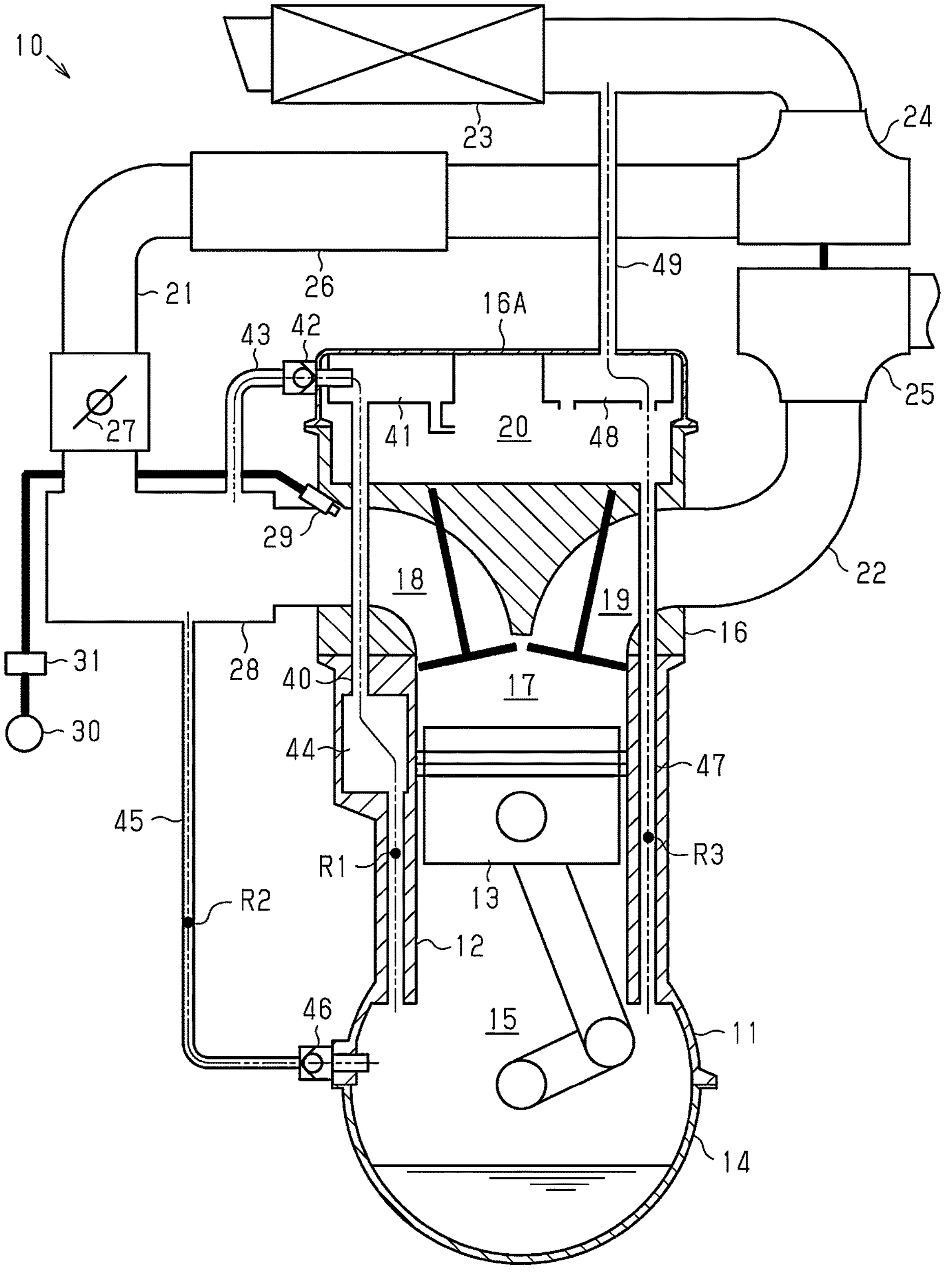
FIG. 1 is a schematic diagram showing the configuration of a blow-by gas recirculation device according to an embodiment.

An embodiment of a blow-by gas recirculation device will now be described in detail with reference to FIGS. 1 to 3.

Configuration of Forced-Induction Engine

The configuration of a forced-induction engine 10 in which the blow-by gas recirculation device of the present embodiment is employed will now be described with reference to FIG. 1. The forced-induction engine 10 shown in FIG. 1 is a hydrogen engine that uses hydrogen as fuel. In hydrogen engines, combustible hydrogen may be included in blow-by gas. Thus, hydrogen engines require higher blow-by gas ventilation performance than gasoline or diesel engines.

The forced-induction engine 10 includes a cylinder block 11. Cylinders 12 are formed inside the cylinder block 11. FIG. 1 shows only one of the cylinders 12. Each cylinder 12 reciprocally accommodates a piston 13. The portion of the cylinder 12 on the upper side of the piston 13 includes a combustion chamber 17 that burns hydrogen. An oil pan 14 that stores oil is attached to the lower part of the cylinder block 11. The portion in the cylinder block 11 on the lower side of the cylinder 12 includes a crankcase 15. A cylinder head 16 is mounted on the upper part of the cylinder block 11. In the cylinder head 16, an intake port 18 and an exhaust port 19 are individually formed for each cylinder 12. A head cover 16A is mounted on the upper side of the cylinder head 16. A valve operating chamber 20 that houses a valvetrain is formed inside the upper part of the cylinder head 16, covered by the head cover 16A.

The forced-induction engine 10 includes an intake passage 21 that introduces air into the combustion chamber 17 and an exhaust passage 22 that discharges exhaust gas from the combustion chamber 17. The intake passage 21 includes an air cleaner 23 that filters dust or the like from the air. The portion of intake passage 21 downstream of the air cleaner 23 includes a compressor 24. The compressor 24, together with a turbine 25 disposed in the exhaust passage 22, forms a turbocharger. The portion of the intake passage 21 downstream of the compressor 24 includes an intercooler 26. The intercooler 26 is a heat exchanger used to cool the air that has been heated due to compression by the compressor 24. The portion of the intake passage 21 downstream of the intercooler 26 includes a throttle valve 27. The throttle valve 27 regulates the flow rate of air delivered through the intake passage 21 to the combustion chamber 17. The intake passage 21 branches for each cylinder 12 in an intake manifold 28 that is located downstream of the throttle valve 27. The intake manifold 28 is connected to the combustion chamber 17 through the intake port 18.

The forced-induction engine 10 includes an injector 29, a hydrogen tank 30, and a pressure regulator 31. The pressure regulator 31 regulates the pressure of hydrogen in the hydrogen tank 30 and supplies it to the injector 29. The injector 29 injects hydrogen into the air that is supplied for combustion in the combustion chamber 17. In FIG. 1, the injector 29 is disposed to inject hydrogen into the intake port 18. Instead, the injector 29 may be disposed to inject hydrogen into the combustion chamber 17.

Configuration of Blow-By Gas Recirculation Device

The configuration of the blow-by gas recirculation device of the present embodiment will now be described with reference to FIG. 1. The blow-by gas recirculation device includes three passages that connect the interior of the crankcase 15 to the intake passage 21; namely, a first passage R1, a second passage R2, and a third passage R3.

The first passage R1 connects the portion of the intake passage 21 downstream of the throttle valve 27 to the interior of the crankcase 15. The first passage R1 includes a blow-by gas passage 40, a head-side separator 41, a first check valve 42, a first PCV hose 43, and a block-side separator 44. The head-side separator 41 and the block-side separator 44 separate oil mist from the blow-by gas flowing through the first passage R1. The head-side separator 41 is attached to the inner side of the head cover 16A. The blow-by gas passage 40 runs through the interior of the cylinder block 11 and the cylinder head 16, connecting the interior of the crankcase 15 to the head-side separator 41. The block-side separator 44 is located in the middle of the blow-by gas passage 40 within the cylinder block 11. The first PCV hose 43 connects the head-side separator 41 to the intake manifold 28. The first check valve 42 permits the flow of gas from the interior of the crankcase 15 to the intake passage 21 through the first passage R1, and restricts the flow of gas from the intake passage 21 to the interior of the crankcase 15 through the first passage R1. The first check valve 42 is located in a portion of the first PCV hose 43 connected to the head-side separator 41. In the present embodiment, the head-side separator 41 and the block-side separator 44 correspond to a first separator that separates oil mist from the blow-by gas flowing through the first passage R1.

The second passage R2 connects the portion of the intake passage 21 downstream of the intercooler 26 to the interior of the crankcase 15. The second passage R2 includes an intake-side end connected to the intake passage 21. The second passage R2 includes a second PCV hose 45 and a second check valve 46. The second PCV hose 45 connects the crankcase 15 to the intake manifold 28. The second check valve 46 permits the flow of gas from the intake passage 21 to the interior of the crankcase 15 through the second passage R2, and restricts the flow of gas from the interior of the crankcase 15 to the intake passage 21 through the second passage R2. The second check valve 46 is located at a portion of the second PCV hose 45 connected to the crankcase 15.

The third passage R3 connects the portion of the intake passage 21 upstream of the compressor 24 to the interior of the crankcase 15. The third passage R3 includes an oil return passage 47, the valve operating chamber 20, a second separator 48, and a third PCV hose 49. The oil return passage 47 passes through the interior of the cylinder block 11 and the cylinder head 16, connecting the valve operating chamber 20 to the interior of the crankcase 15. The oil return passage 47 functions as a passage for recirculating oil from the valve operating chamber 20 to the oil pan 14, and functions as a passage for circulating gas between the valve operating chamber 20 and the interior of the crankcase 15. The second separator 48 separates oil mist from the blow-by gas flowing through the third passage R3. The second separator 48 is located on the inner side of the head cover 16A. The third PCV hose 49 connects a portion of the intake passage 21 located downstream of the air cleaner 23 and upstream of the compressor 24 to the second separator 48.

The second passage R2 in the blow-by gas recirculation device of the present embodiment is configured to have a minimum flow passage area that is smaller than the minimum flow passage area of the third passage R3. The minimum flow passage area represents a flow passage area where the flow passage area for gas is the smallest in a passage. The relationship between the minimum flow passage areas can be achieved by, for example, using a hose with a smaller diameter than the third PCV hose 49 as the second PCV hose 45. The relationship can also be achieved by arranging a constriction in the middle of the second passage R2.

Operation and Advantages of Present Embodiment

The operation and advantages of the present embodiment will now be described with reference to FIGS. 2 and 3. The outline arrows shown in FIGS. 2 and 3 indicate the flow direction of air within the blow-by gas recirculation device. The black arrows shown in FIGS. 2 and 3 indicate the flow direction of blow-by gas within the blow-by gas recirculation device.

Figure 2:
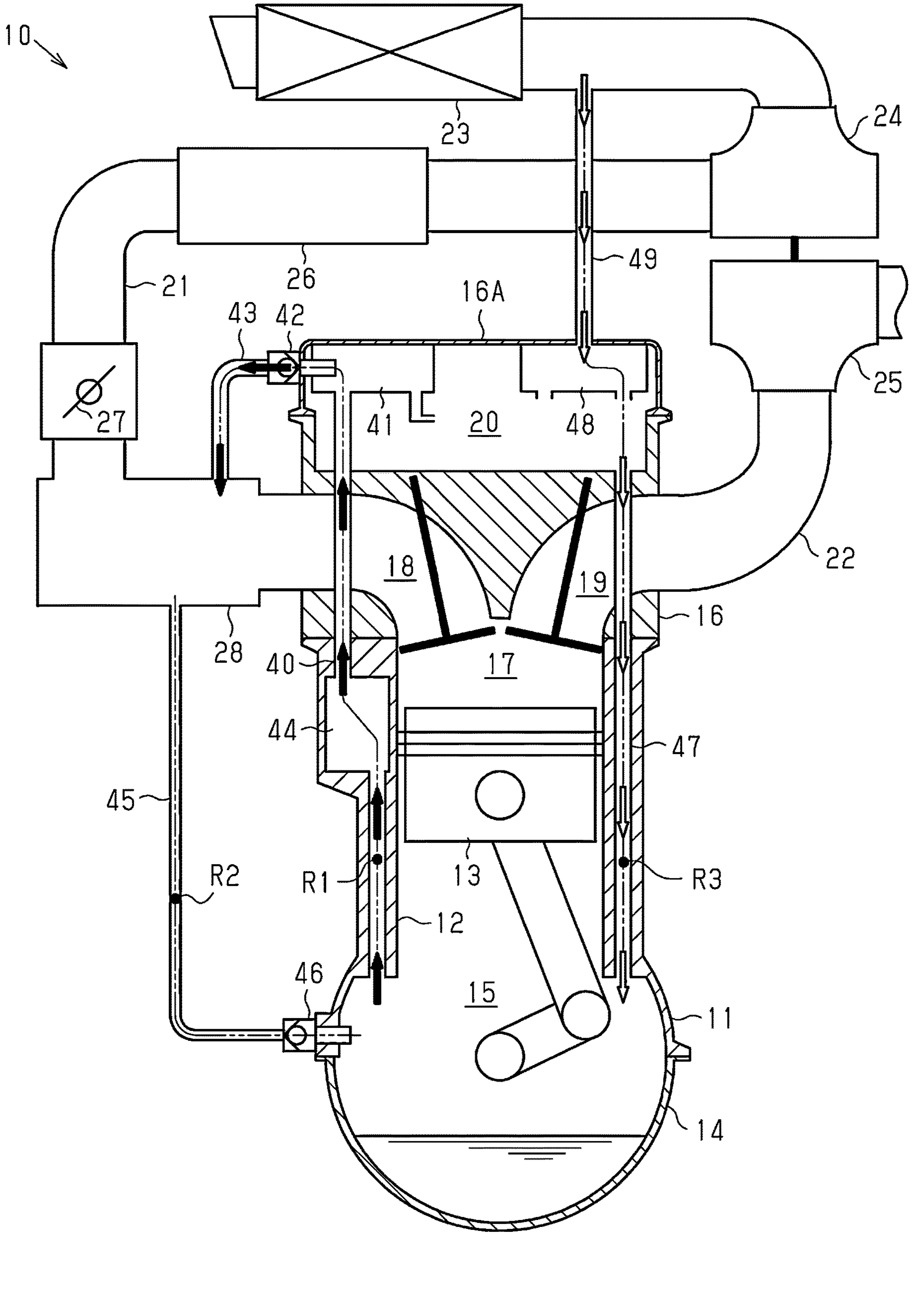
FIG. 2 is a diagram illustrating the state of the blow-by gas recirculation device shown in FIG. 1 during naturally aspirated operation.

FIG. 2 is a diagram illustrating the state of the blow-by gas recirculation device during naturally aspirated operation. During naturally aspirated operation, the inside of the intake manifold 28 is at negative pressure, meaning the pressure is lower than atmospheric pressure. The interior of the crankcase 15 is connected to the intake manifold 28 through the first passage R1. The first check valve 42, in the first passage R1, is configured to permit the flow of gas from the interior of the crankcase 15 toward the intake passage 21 through the first passage R1. The interior of the crankcase 15 is connected through the third passage R3 to the portion of the intake passage 21 upstream of the compressor 24. Thus, during naturally aspirated operation, air is introduced into the crankcase 15 through the third passage R3, and the blow-by gas in the crankcase 15 is drawn into the intake manifold 28 through the first passage R1.

Figure 3:
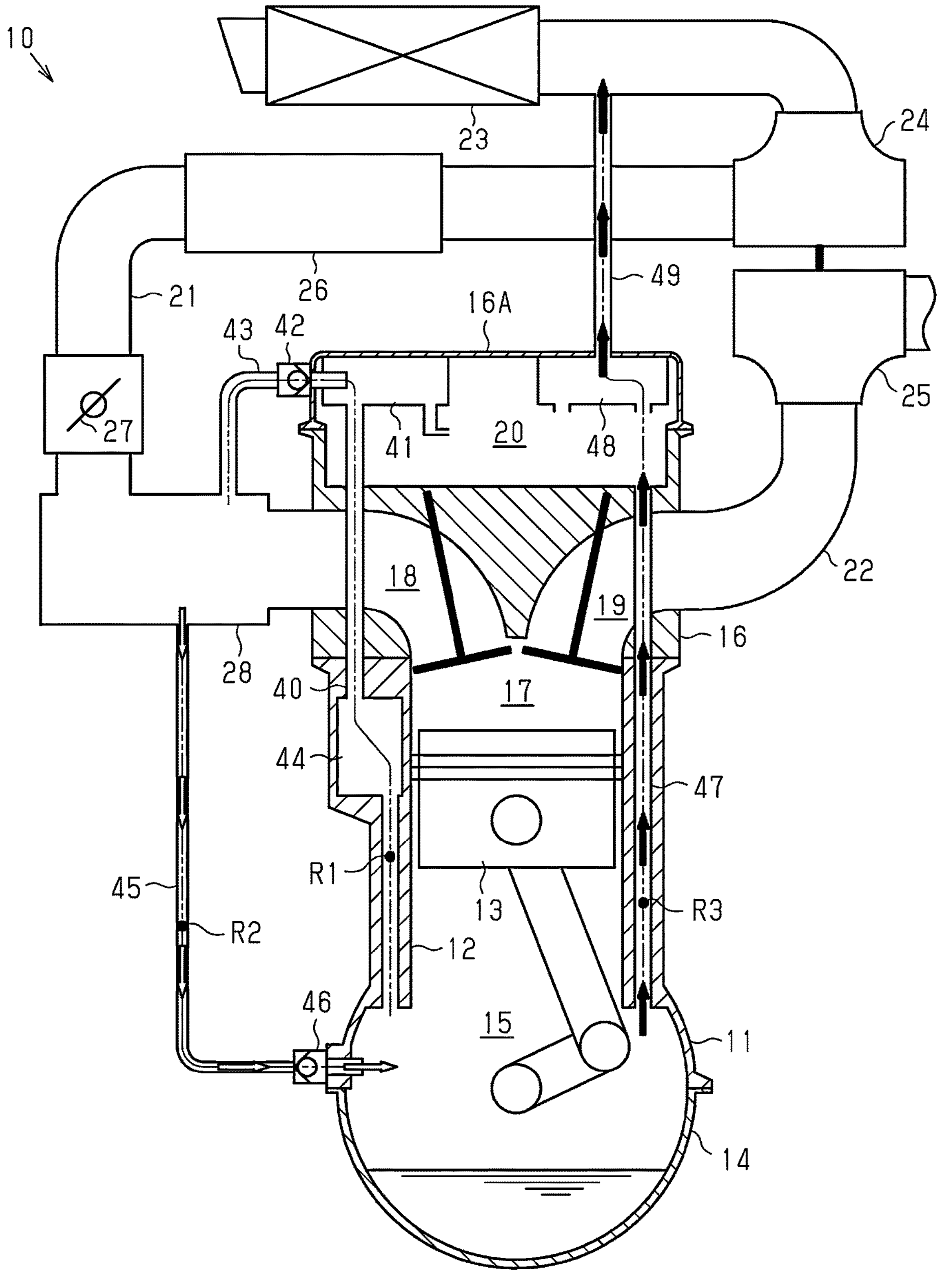
FIG. 3 is a diagram illustrating the state of the blow-by gas recirculation device shown in FIG. 1 during forced-induction operation.

FIG. 3 is a diagram illustrating the state of the blow-by gas recirculation device during forced-induction operation. During forced-induction operation, the portion of the intake passage 21 downstream of the compressor 24 is at positive pressure, meaning the pressure is higher than the atmospheric pressure. The second passage R2 connects the interior of the crankcase 15 to the intake manifold 28, which is part of the intake passage 21 at positive pressure. The second check valve 46, in the second passage R2, is configured to permit the flow of gas from the intake passage 21 toward the crankcase 15 through the second passage R2. Thus, during forced-induction operation, air is introduced into the crankcase 15 through the second passage R2. The introduced air at positive pressure causes the blow-by gas to be delivered from the crankcase 15 to the intake passage 21 through the third passage R3.

When a larger amount of gas flows into the crankcase 15 through the second passage R2 than the flow rate of gas delivered to the intake passage 21 through the third passage R3, gas accumulates inside the crankcase 15, causing the internal pressure to increase. When the internal pressure of the crankcase 15 increases, oil blow-up and leakage of blow-by gas to the outside are more likely to occur. In oil blow-up, oil flows into the combustion chamber 17 through the gap between the piston 13 and the cylinder 12. To solve this problem, in the blow-by gas recirculation device of the present embodiment, the minimum flow passage area of the second passage R2 is smaller than the minimum flow passage area of the third passage R3. That is, the third passage R3 is designed to allow a larger amount of gas to flow through than the second passage R2. This limits the increase in the internal pressure of the crankcase 15 that would be caused by the accumulation of gas.

The blow-by gas recirculation device of the present embodiment achieves the following advantages.

(1) The blow-by gas recirculation device of the present embodiment includes the first passage R1, the second passage R2, the third passage R3, the first check valve 42, and the second check valve 46. The first passage R1 connects the portion of the intake passage 21 downstream of the throttle valve 27 to the interior of the crankcase 15. The second passage R2 connects the portion of the intake passage 21 downstream of the intercooler 26 to the interior of the crankcase 15. The third passage R3 connects the portion of the intake passage 21 upstream of the compressor 24 to the interior of the crankcase 15. The first check valve 42 permits the flow of gas from the interior of the crankcase 15 to the intake passage 21 through the first passage R1, and restricts the flow of gas from the intake passage 21 to the interior of the crankcase 15 through the first passage R1. The second check valve 46 permits the flow of gas from the intake passage 21 to the interior of the crankcase 15 through the second passage R2, and restricts the flow of gas from the interior of the crankcase 15 to the intake passage 21 through the second passage R2. The blow-by gas recirculation device ventilates blow-by gas within the crankcase 15 during both naturally aspirated operation and forced-induction operation of the forced-induction engine 10.

(2) If the intake-side end of the second passage R2 were connected to the portion of the intake passage 21 upstream of the intercooler 26 and downstream of the compressor 24, it would allow air to be introduced into the crankcase 15 through the second passage R2 during forced-induction operation. However, in this case, high-temperature air before being cooled by the intercooler 26 would be introduced into the crankcase 15. By contrast, in the blow-by gas recirculation device of the present embodiment, the second passage R2 is configured to connect the portion of the intake passage 21 downstream of the intercooler 26 to the interior of the crankcase 15. Thus, the blow-by gas recirculation device of the present embodiment allows the air cooled by the intercooler 26 to be introduced into the crankcase 15 during forced-induction operation. Accordingly, since dense air is introduced at relatively low temperatures, blow-by gas in the crankcase 15 is ventilated more efficiently compared to when low-density air is introduced at relatively high temperatures.

(3) In the blow-by gas recirculation device of the present embodiment without the second passage R2 and the second check valve 46, the third passage R3 would be used solely as a passage to introduce air into the crankcase 15. By contrast, the blow-by gas recirculation device of the present embodiment includes the second passage R2, which connects the portion of the intake passage 21 downstream of the intercooler 26 to the interior of the crankcase 15. Further, the blow-by gas recirculation device of the present embodiment includes the second check valve 46. During forced-induction operation, the second check valve 46 opens and uses the second passage R2 as an air introduction passage. The second check valve 46 closes during naturally aspirated operation, thereby sealing the second passage R2. The arrangement of the second passage R2 and the second check valve 46 causes the third passage R3 to function as an air intake passage during naturally aspirated operation and function as a blow-by gas release passage during forced-induction operation. Thus, with a relatively simple configuration, the blow-by gas recirculation device ventilates blow-by gas inside the crankcase 15 during both naturally aspirated operation and forced-induction operation.

(4) In the present embodiment of the blow-by gas recirculation device, during forced-induction operation, air is introduced into the crankcase 15 through the second passage R2, and blow-by gas inside the crankcase 15 is released into the intake passage 21 through the third passage R3. If the amount of air introduced into the crankcase 15 is greater than the amount of blow-by gas released from the crankcase 15, the internal pressure of the crankcase 15 increases. In the blow-by gas recirculation device of the present embodiment, the second passage R2 has a minimum flow passage area smaller than the minimum flow passage area of the third passage R3. This makes it easier for gas to flow through the third passage R3 than through the second passage R2. This prevents situations in which gas accumulates in the crankcase 15 and its internal pressure rises during forced-induction operation.

(5) In the blow-by gas recirculation device of the present embodiment, separators used to separate oil mist are disposed in the first passage R1 and the third passage R3, each of which functions as a passage for releasing blow-by gas during natural aspiration operation and forced-induction operation. This prevents oil from mixing with intake air that results from blow-by gas recirculation.

(6) In the present embodiment of the blow-by gas recirculation device, the second check valve 46 is located at the portion of the second passage R2 connected to the crankcase 15. The second check valve 46 is configured to restrict the flow of gas from the interior of the crankcase 15 to the second PCV hose 45. Thus, even if the second PCV hose 45 is torn or disconnected from a connector to damage the second passage R2, the blow-by gas inside the crankcase 15 is less likely to be released into the external air. Further, if the second passage R2 is damaged, the intake manifold 28 is exposed to the external air. When the intake manifold 28 is exposed to the external air, the intake pressure and intake flow rate change immediately. Accordingly, the arrangement of the second check valve 46 at the portion of the second passage R2 connected to the crankcase 15 allows for easy and quick detection of damage to the second passage R2.

(7) The function of the first check valve 42 is similar to that of a PCV valve used in the blow-by gas recirculation device for a naturally aspirated engine. This allows an existing PCV valve to be employed in the first check valve 42. Further, the functions of the first check valve 42 and the second check valve 46 are identical except for the direction in which they permit or restrict the flow of gas. This allows the first check valve 42 and the second check valve 46 to be used as common components. Alternatively, many aspects of the design of the first check valve 42 are applicable to the design of the second check valve 46.

Modifications

The present embodiment may be modified as follows. The present embodiment and the following modifications can be combined as long as they remain technically consistent with each other.

In the above embodiment, the intake-side end of the second passage R2 is connected to the intake manifold 28. The intake-side end of the second passage R2 may be connected to a portion other than the intake manifold 28 if it is a portion of the intake passage 21 downstream of the intercooler 26. For example, the intake-side end of the second passage R2 may be connected to the section of the intake passage 21 between the intercooler 26 and the throttle valve 27.

Figure 4:
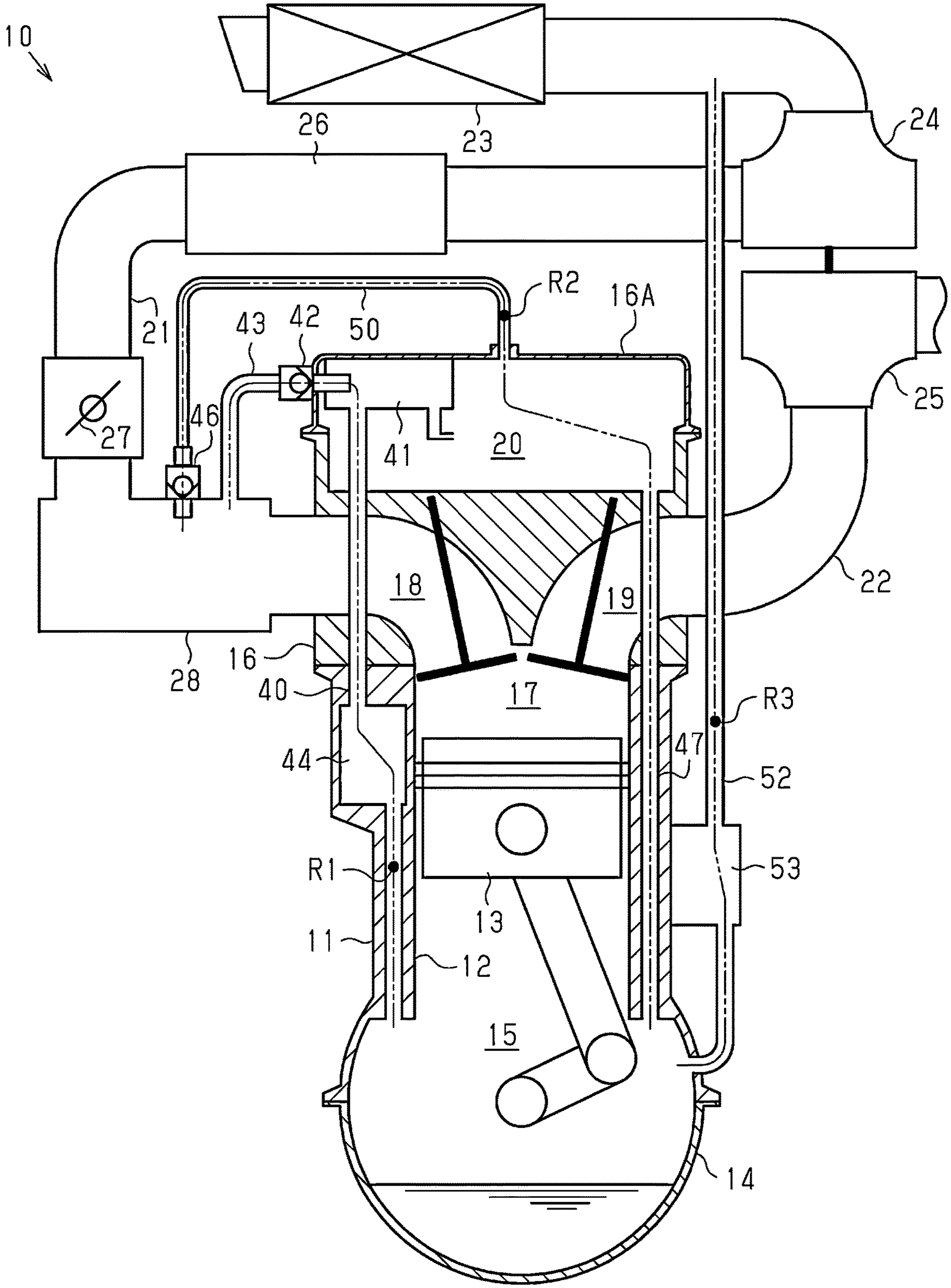
FIG. 4 is a schematic diagram showing the configuration of a blow-by gas recirculation device according to another embodiment.

The third passage R3 may be configured to connect the interior of the crankcase 15 to the intake passage 21 without passing through the valve operating chamber 20. For example, FIG. 4 shows an example of a third passage R3 formed by a third PCV hose 52 that connects the crankcase 15 to the intake passage 21. One end of the third PCV hose 52 is connected to the cylinder block 11, and the other end is connected to a portion of the intake passage 21 located between the air cleaner 23 and the compressor 24. In the forced-induction engine 10 shown in FIG. 4, a second separator 53 that separates oil mist is disposed in the middle of the third PCV hose 52. The second separator 53 is fixed to the outer wall of the cylinder block 11.

The second check valve 46 may be located in the portion of the second passage R2 connected to the intake passage 21 or in the middle of the second passage R2.

The second passage R2 may be configured to connect the interior of the crankcase 15 to the intake passage 21 through the valve operating chamber 20. FIG. 4 illustrates an example configuration of such a second passage R2. The second passage R2 in FIG. 4 connects the interior of the crankcase 15 to the intake manifold 28 through the oil return passage 47, the valve operating chamber 20, the second PCV hose 50, and the second check valve 46. The opposite ends of the second PCV hose 50 in FIG. 4 are respectively connected to the head cover 16A and the intake manifold 28. In FIG. 4, the second check valve 46 is located at a portion of the second PCV hose 50 connected to the intake manifold 28.

In the blow-by gas recirculation device in the above embodiment, the two separators (i.e., head-side separator 41 and block-side separator 44) are disposed as the first separator to separate oil mist from the gas flowing through the first passage R1. The number of separators included in the first separator may be changed. Additionally, the second separators 48, 53, which separate oil mist from the gas flowing through the third passage R3, may include multiple separators. If burning the oil mist in the blow-by gas in the combustion chamber 17 is sufficient for treatment, those separators may be omitted.

The second passage R2 may have a minimum flow passage area equal to or larger than that of the third passage R3. In such a case, the increase in oil blow-up, the leakage of blow-by gas, and the like resulting from internal pressure rise in the crankcase 15 are limited by disposing an additional mechanism in the forced-induction engine 10 to limit the internal pressure rise.

Some or all of the first PCV hose 43, the second PCV hoses 45, 50, and the third PCV hoses 49, 52 may be replaced with metal hoses.

The blow-by gas recirculation device of the above embodiment may be employed in forced-induction engines other than hydrogen engines, such as gasoline engines and diesel engines.

For an engine including banks and compressors, such as a V-type engine, the blow-by gas recirculation device of the above embodiment may be disposed in each bank.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A blow-by gas recirculation device configured to recirculate blow-by gas from an interior of a crankcase of a forced-induction engine to an intake passage, wherein the forced-induction engine includes:

- a compressor disposed in the intake passage;
- an intercooler disposed in a portion of the intake passage downstream of the compressor; and a throttle valve disposed in a portion of the intake passage downstream of the intercooler, the blow-by gas recirculation device comprises:

- a first passage that connects a portion of the intake passage downstream of the throttle valve to the interior of the crankcase;
- a second passage that connects the portion of the intake passage downstream of the intercooler to the interior of the crankcase;
- a third passage that connects a portion of the intake passage upstream of the compressor to the interior of the crankcase;
- a first check valve configured to permit a flow of gas from the interior of the crankcase to the intake passage through the first passage and restrict a flow of gas from the intake passage to the interior of the crankcase through the first passage; and
- a second check valve configured to permit a flow of gas from the intake passage to the interior of the crankcase through the second passage and restrict a flow of gas from the interior of the crankcase to the intake passage through the second passage, and the second passage and the third passage are separate from each other.

2. The blow-by gas recirculation device according to claim 1, wherein a minimum flow passage area of the second passage is smaller than a minimum flow passage area of the third passage.

3. The blow-by gas recirculation device according to claim 1, comprising:

a first separator configured to separate oil mist from the gas flowing through the first passage; and a second separator configured to separate oil mist from the gas flowing through the third passage.

4. The blow-by gas recirculation device according to claim 3, wherein the forced-induction engine includes a cylinder block including the crankcase, a cylinder head mounted on an upper portion of the cylinder block, and a head cover mounted on an upper side of the cylinder head, and the first passage connects the intake passage to the interior of the crankcase via the head cover, the cylinder head, and the cylinder block.

5. The blow-by gas recirculation device according to claim 4, wherein the first separator includes a head-side separator provided in the head cover and a block-side separator provided in the cylinder block.

6. The blow-by gas recirculation device according to claim 1, wherein the second check valve is located at a portion of the second passage connected to the crankcase.

7. The blow-by gas recirculation device according to claim 1, wherein a fuel for the forced-induction engine is hydrogen.

8. The blow-by gas recirculation device according to claim 1, wherein the second passage connects the portion of the intake passage downstream of the throttle valve to the interior of the crankcase.

* * * * *